United States Patent [19]
Beidle et al.

[11] Patent Number: 5,343,403
[45] Date of Patent: Aug. 30, 1994

[54] METHOD FOR HOST-INDEPENDENT CARTRIDGE ENTRY IN AN AUTOMATED LIBRARY SYSTEM

[76] Inventors: David A. Beidle, 8059 Meadowdale Sq., Longmont, Colo. 80503; Karen L. Fields, 3090 W. 133rd Ave., Broomfield, Colo. 80020; Catherine L. Griffith, 548 Lincoln Ave., Louisville, Colo. 80027; Frederick G. Munro, 2315 Ridge Cir., Broomfield, Colo. 80020

[21] Appl. No.: 745,015
[22] Filed: Aug. 14, 1991
[51] Int. Cl.$^5$ .................. G11B 15/00; G11B 17/22
[52] U.S. Cl. ..................... 364/478; 369/33; 369/34
[58] Field of Search ............ 364/478; 369/33–39; 360/91, 92, 98.04, 98.05

[56] References Cited

U.S. PATENT DOCUMENTS

| | | | |
|---|---|---|---|
| 4,527,262 | 7/1985 | Manto | 369/33 |
| 4,864,438 | 9/1989 | Munro | 369/33 |
| 4,932,826 | 6/1990 | Moy et al. | 414/277 |
| 4,945,429 | 7/1990 | Munro et al. | 369/34 |
| 4,980,818 | 12/1990 | Shinmura | 369/34 |
| 5,164,909 | 11/1992 | Leonhardt et al. | 364/478 |

Primary Examiner—Jerry Smith
Assistant Examiner—Thomas E. Brown

[57] ABSTRACT

A method is disclosed for providing a host-independent cartridge entry mode in an automated tape cartridge library connected to more than one host computer. In host-independent cartridge entry mode, a message is broadcast by a library management unit to all of the host computers when an operator loads a cartridge or cartridges into the library cartridge access port. The host computers then vie for control of the cartridge access port, and a selection algorithm determines which host computer is allocated to control the cartridge access port. The selected host computer then catalogs the cartridges contained in the cartridge access port and issues a command to move the cartridges out of the cartridge access port. When the automated library is in host-independent mode, the operator need not issue a command each time additional cartridges are to be entered into the library, since the method of the present invention initiates automatic cartridge catalog and cartridge move operations whenever a cartridge access port door is closed.

12 Claims, 3 Drawing Sheets

METHOD FOR HOST-INDEPENDENT CARTRIDGE ENTRY IN AN AUTOMATED LIBRARY SYSTEM

FIELD OF THE INVENTION

This invention relates generally to data storage and retrieval systems, and more particularly to an improved method for entering cartridges containing computer-readable media into an automated cartridge library system connected to more than one host computer.

PROBLEM

In prior art multiple-host automated tape cartridge library systems, entry of tape cartridges into the library required that a single host computer be exclusively and continuously in control of the entry process. Control of a given cartridge entry task was exclusively reserved to a specific host due to typical problems arising from the situation wherein a multiplicity of computers concurrently attempt to manage a data storage/retrieval task. These problems include database integrity, control deadlock, etc. However, by using a single specific host for cartridge entry control, another problem was created. If the controlling host computer failed at any time, the entire cartridge access/entry port would become unavailable for use until the completion of a lengthy recovery process. Furthermore, the library operator was required to issue a command to the host computer each time additional tape cartridges were entered into the library.

SOLUTION

These problems are solved and a technical advance achieved in the field by the host-independent cartridge entry method of the present invention. While allowing the prior functionality of continuous cartridge entry management by a specific host computer, the present method also provides a new mode wherein any host computer connected to the automated cartridge library may acquire control of the entry process. In the new, "host-independent" mode, a message is broadcast by a library management unit to all of the host computers when an operator loads a cartridge or cartridges in the library cartridge access port. The host computers then vie for control of the cartridge access port, and a selection algorithm determines which host computer is allocated to control the cartridge access port. The selected host computer then catalogs the cartridges contained in the cartridge access port and issues a command to move the cartridges out of the cartridge access port. Finally, the host computer releases control of the cartridge access port so that the cartridge access port is again ready for host-independent entry. An additional feature of the present invention is that when the automated library is in host-independent mode, the operator need not issue a command each time additional cartridges are to be entered into the library, since the method of the present invention initiates automatic cartridge catalog and cartridge move operations whenever a cartridge access port door is closed.

DETAILED DESCRIPTION OF THE INVENTION

An automated tape cartridge system with which the method of the present invention operates is described in U.S. Pat. No. 4,932,826 to Moy, et al., and is hereby incorporated by reference.

Figure 1:
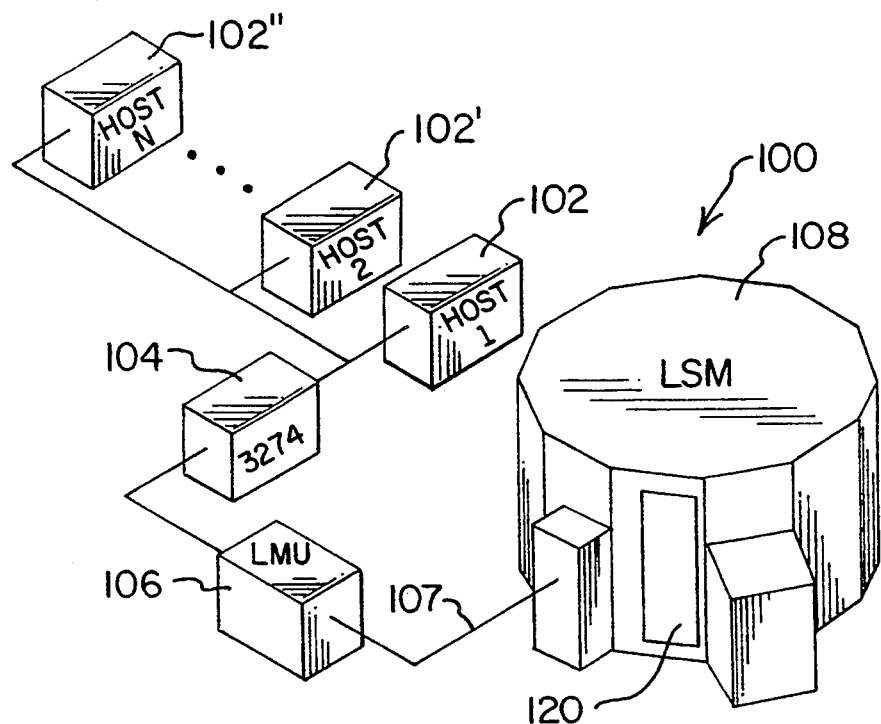
FIG. 1 shows the components of a typical automated tape cartridge library with which the method of the present invention operates.

FIG. 1 shows the components of a typical automated tape cartridge library with which the method of the present invention operates. Referring to FIG. 1, the automated tape cartridge library system 100 includes a plurality of host computers 102, 102', 102" which are connected via a conventional 327X type terminal controller 104, or an RS-232 serial line, to a library management unit (LMU) 106. The library management unit 106 serves as the library controller and provides the interface for the host computers 102 and one or more library storage modules (LSMs) 108. The library management unit 106 interprets commands from the host computers 102, relaying appropriate instructions to the selected library storage module 108 via a control path 107. Each library storage module 108 provides the necessary mechanisms for automated handling of media cartridges, such as industry-standard 3480 type magnetic tape cartridges. It is to be understood, however, that the cartridges handled by the method of the present invention are not limited to those containing magnetic tape, but may also contain magnetic or optical disk, or any other computer-readable media.

Figure 4:
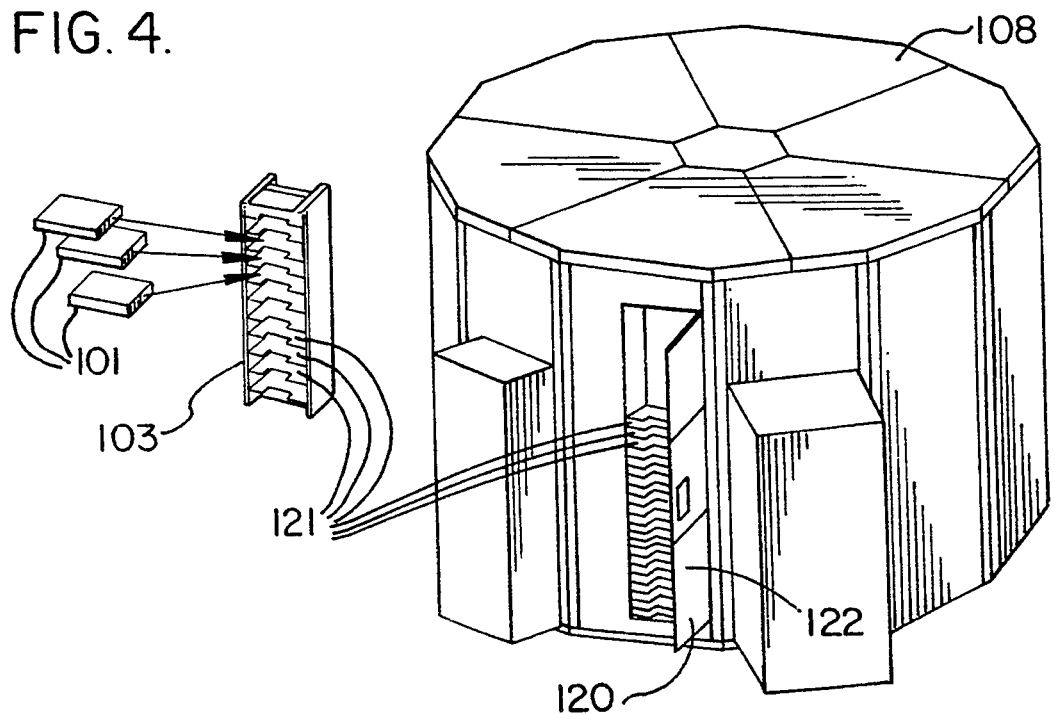
FIG. 4 shows a library storage module with a pair of cartridge access ports (one of which has the door opened), and a cartridge magazine for holding cartridges to be inserted into a cartridge access port.

FIG. 4 shows a library storage module having a cartridge access port 120, (with the cartridge access port door 122 shown opened), and a cartridge magazine 103 for holding cartridges 101 to be inserted into the cartridge access port 120. Cartridges are entered into and retrieved ("ejected") from the library storage module via the cartridge access port (CAP) 120. The cartridge access port 120 comprises a cell array of a plurality of cell locations that are directly accessible to a robotic means (not shown) located inside of the library storage module 108. Each cell location is capable of containing a media cartridge. The cartridge access port 120 has a door which is capable of being locked in order to prevent operator access of the cartridges while they are being processed by the library storage module. The library storage module robotic means provides for mounting a selected cartridge on a tape drive (not shown) located within the library storage module 108. The library storage module 108 also typically includes means for identifying and selecting cartridges via an optical scheme for reading labels affixed to the cartridges. The library storage module 108 also contains "cells" for storing a large quantity (approximately 6000) of the cartridges.

Cartridge Access Port Reservation

Figure 2:
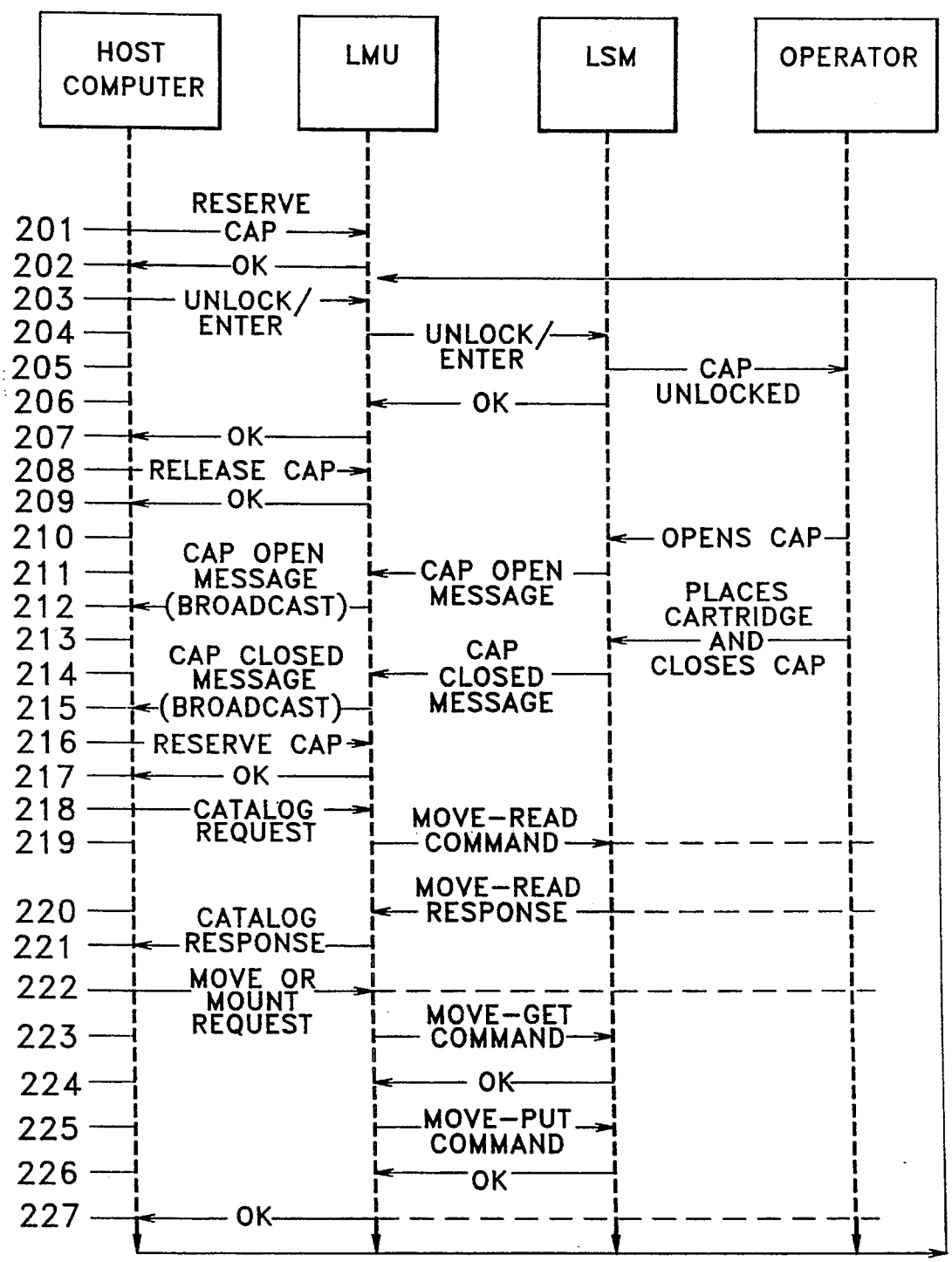
FIG. 2 is a transaction diagram showing the sequence of commands and messages which flow between a host computer, the library management unit, the library storage module, and the operator.
Figure 3:
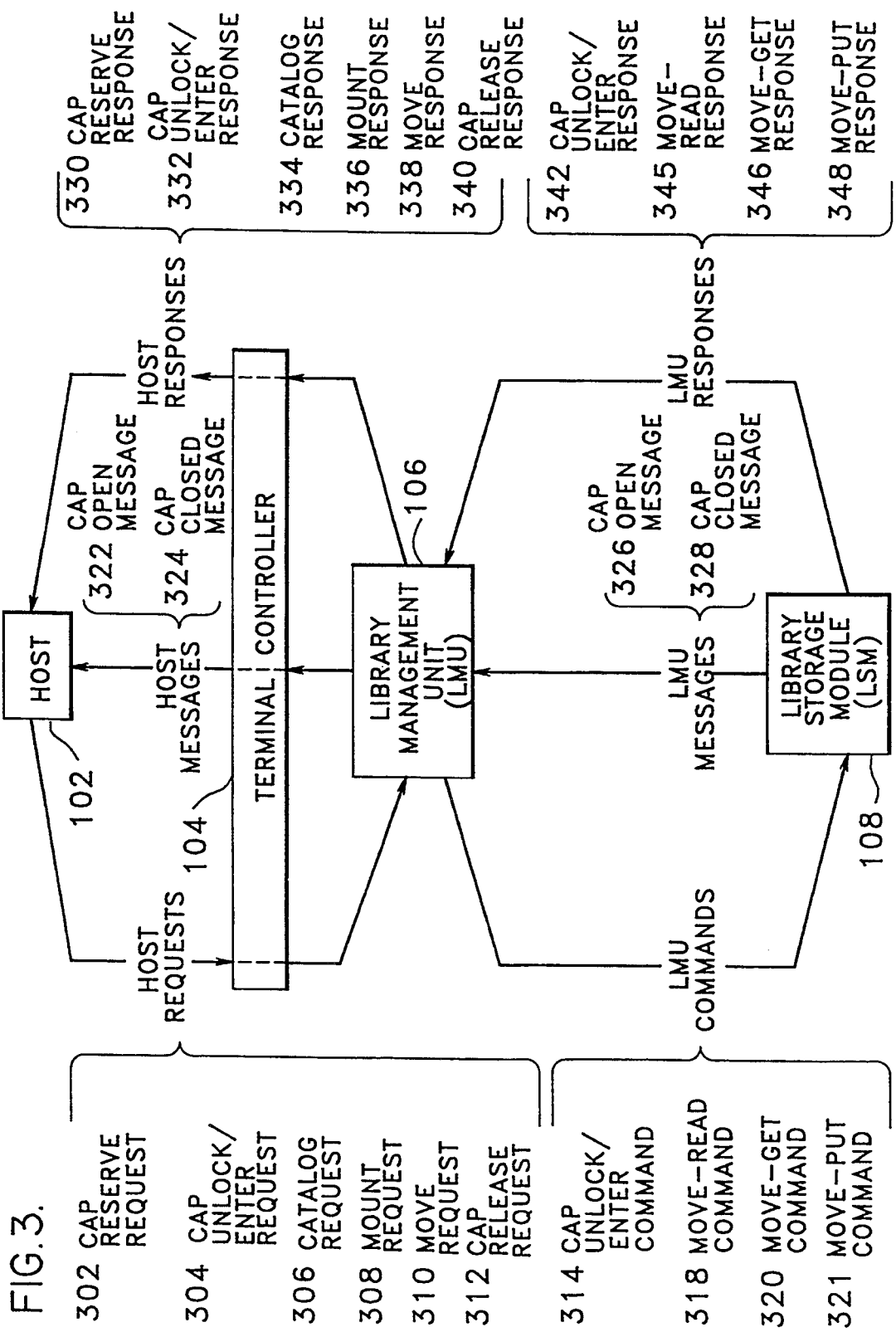
FIG. 3 shows the commands, messages and responses transmitted between a host computer, the library management unit and the library storage module.

FIG. 2 shows the sequence of commands and messages which flow between a host computer 102, the library management unit 106, the library storage module 108, and a library operator; and FIG. 3 shows the commands, messages and responses transmitted between the host computer 102, terminal controller 104, library management unit 106 and library storage module 108. More specifically, FIG. 3 shows the host computer, the library management unit, and the library storage module, and the flow of commands ("requests"), messages, and responses therebetween. Note that "Host Requests" are transmitted from the host computer 102 to the library management unit 106; and "Host Responses" and "Host Messages" are transmitted from the library management unit 106 to the host computer 102. The dotted lines shown within the terminal controller 104 indicate that the terminal controller 104 is "transparent" with respect to all transmissions between the host computer 102 and the library management unit 106; that is, the content of the transmissions is not processed by the terminal controller 104. FIG. 3 also shows that "LMU Commands" are transmitted from the library management to the library storage module, and "LMU Responses" and "LMU Messages" are transmitted from the library storage module 108 to the library management unit 106.

Referring to FIGS. 2 and 3, the information flow for a host-independent entry (hereinafter called an "ENTER" operation) of one or more cartridges into the library storage module 108 is described. When host-independent cartridge entry mode is selected by a library operator, an arbitrarily selected host computer 102 responds by issuing an initializing CAP RESERVE request command 302, at step 201. This CAP RESERVE request 302 is required because a host computer 102 (arbitrarily selected) must be initially in control of the cartridge access port 120 in order to issue the subsequently required UNLOCK CAP request command 304 (described below). The CAP RESERVE request 302 contains the library storage module identifier of a specific cartridge access port 120, and causes the cartridge access port 120 to become reserved to the requesting host computer 102 until a CAP RELEASE 312 request is issued. An affirmative acknowledgement ("OK") 330 of the CAP RESERVE REQUEST 302 is returned by the library management unit 106, at step 202, if the library management unit is able to establish the requested reservation.

Next, at step 203 the controlling host computer 102 (which has reserved the cartridge access port) issues, to the library management unit 106, an UNLOCK CAP request with an ENTER option 304. The library management unit 106 then issues, at step 204, an UNLOCK/ENTER command 314 to the library storage module 108. The library storage module unlocks the cartridge access port door, and at step 205, notifies the library operator that the cartridge access port 120 is unlocked and available for entering cartridges. At step 206, the library storage module notifies the library management unit (via response 342) of the success of the UNLOCK command 314, and, at step 207, the library management unit notifies (via response 332) the host computer 102 likewise, that the cartridge access port 120 is unlocked.

The host computer 102 then releases control of the cartridge access port 120 by issuing, at step 208, a RELEASE CAP command 312 to the library management unit. The library management unit responds, at step 209, with an affirmative acknowledgement 340 that the cartridge access port 120 has been released and unlocked. The reservation of the cartridge access port 120 by the controlling host computer 102 is thus terminated and the cartridge access port 120 is now in a host-independent mode. In host-independent mode, cartridges can be loaded into the cartridge access port 120 without requiring the library operator to issue a command to the cartridge library system 100 each time additional cartridges are to be entered into the library.

Host-Independent Mode

At step 210, the library operator opens the cartridge access port door in preparation for insertion of cartridges into the cartridge access port 120. When the cartridge access port 120 is opened, the library storage module 108, at step 211, sends a CAP OPEN message 326 to the library management unit 106. In response to the message that the cartridge access port 120 has been opened, the library management unit 106, at step 212, broadcasts a CAP OPEN message 322 to all host computers 102 with which the library management unit 106 is currently communicating. At step 213, the library operator next inserts one or more cartridges into the cartridge access port 120 and closes the cartridge access port door. When the cartridge access port door is closed, the library storage module 108 notifies the library management unit 106 of this event by issuing, at step 214, a CAP CLOSED message 328. At step 215, the library management unit 106 broadcasts a CAP CLOSED message 324 to all host computers 102 with which it is currently communicating. One or more host computers 102 then accept the the CAP CLOSED message 324 and, at step 216, attempt to reserve the cartridge access port 120 with a CAP RESERVE request 302. The first host computer 102 whose CAP RESERVE request 302 is received by the library management unit 106 becomes the host computer 102 exclusively in control of the cartridge access port 120. In response to the first CAP RESERVE request 302 received, the library management unit 106, at step 217, issues an acknowledgement to the requesting host computer 102. All CAP RESERVE requests 302 from other host computers 102', 102'' are rejected, since the cartridge access port 120 can be reserved only by a single host computer 102 at any given time.

The host computer 102 holding the cartridge access port reservation issues to the library management unit 106, at step 218, a CATALOG request 306 for the cartridge access port 120. The library management unit 106 then, at step 219, uses MOVE-READ commands 318 (issued to the library storage module 108) to determine which cartridges have been loaded into the cartridge access port 120. Each MOVE-READ command 318 is addressed to a target cartridge storage location (target "cell"). At step 220, the library storage module 108 responds (to the library management unit 106) with an indication 345 of whether a cartridge is present in the target cell, and the VOLSER (cartridge ID) of the cartridge, if one is present. When all cartridge identification information is collected by the library management unit 106, the library management unit 106, at step 221, sends the host computer 102 a CATALOG response 334 indicating the VOLSERs of all the cartridges which have now been loaded in the cartridge access port 120.

At step 222, the host computer 102 issues requests to the library management unit 106 that cartridges in the cartridge access port 120 be moved either to other storage cells in the library storage module 108, using the MOVE request 310, or to tape transports in the library storage module 108, using the MOUNT request 308. At steps 223 and 225, each cartridge in the cartridge access port 120 is moved therefrom by a MOVE-GET/MOVE-PUT pair of commands 320/31 issued by the library management unit 106 to the library storage module 108. The MOVE-GET command 320 causes the library storage module 108 to pick up a cartridge at a specified cell location in the cartridge access port 120, and the MOVE-PUT command 321 causes the library storage module 108 to place the cartridge being moved, into a specified cell location in the library storage module 108. At steps 224 and 226, The library storage module 108 replies to the library management unit 106 with responses 346/348 indicating that the MOVE-GET/MOVE-PUT operations were successful. At step 227, the library management unit 106 indicates to the host computer 102 that the MOVE-GET/MOVE-PUT operations are complete.

Since the cartridge access port 120 is now in host-independent cartridge entry mode, the host computer 102 returns back to step 203, where it again issues to the library management unit 106, an UNLOCK CAP request with the ENTER option 304. Finally, the above described sequence of releasing the cartridge access port 120 is repeated (at steps 203 through 207), wherein the UNLOCK command 304 has been passed to the library storage module 108 via the library management unit 106 UNLOCK command 314, and the library storage module 108 and library management unit 106 have responded to the commands 304,314. The host computer 102 again releases the cartridge access port 106, at step 208, and the cartridge access port 120 is once again unlocked in host-independent mode. The library operator may now open the cartridge access port door and enter cartridges thereinto without being first required to input a command to the host computer 102. When the operator closes the cartridge access port door, the cartridge library system 100 resumes cartridge processing at step 214.

It is to be expressly understood that the claimed invention is not to be limited to the description of the preferred embodiment but encompasses other modifications and alterations within the scope and spirit of the inventive concept.

We claim:

1. A method for controlling the loading of at least one computer-readable media cartridge into an access port of an automated media cartridge library having a plurality of host computers connected thereto, said method comprising the steps of:
   (a) reserving exclusive control of said access port to a controlling one of said host computers after at least one said media cartridge has been loaded into said access port;
   (b) moving each said media cartridge from said access port to a storage location in said media cartridge library; and
   (c) releasing said access port from said exclusive control of said controlling one of said host computers;
   wherein the step of reserving includes
       broadcasting, to each of said host connected to said media cartridge library, a message indicating that said access port is available for said reserving; and
       in the situation wherein concurrent to reserve said access port are made by more than one of said host computers, selecting one of said host computers to acquire said exclusive control of said access port;
   wherein said steps reserving, moving, and releasing are performed by said media cartridge library.

2. The method of claim 1, including the additional step of:
   cataloging each said media cartridge loaded into said access port between step (a) and step (b).

3. A method for controlling the loading of at least one computer-readable media cartridge into an access port of an automated media cartridge library having a plurality of host computers connected thereto, wherein said access port is capable of being opened and closed, said method comprising the steps of:
   (a) broadcasting to each of said host computers connected to said media cartridge library, after at least one said media cartridge has been loaded into said access port and said access port has been closed a message indicating that said access port is available for said reserving;
   (b) reserving exclusive control of said access port to a controlling one of said host computers;
   (c) in the situation wherein concurrent requests to reserve said access port are made by more than one of said host computers, selecting a said controlling one of said host computers to acquire said exclusive control of said access port;
   (d) cataloging each said media cartridge loaded into said access port;
   (e) moving each said media cartridge from said access port to a storage location in said media cartridge library;
   (f) unlocking a said access port for loading said media cartridge thereinto; and
   (g) releasing said access port from said exclusive control by said controlling one of said host computers;
   wherein said steps (a) through (g) are performed by said media cartridge library.

4. The method of claim 3, wherein the step of cataloging includes transmitting, to said controlling one of said host computers, indicia of all said media cartridges loaded into said access port.

5. The method of claim 3, including performing, prior to step (a), for the purpose of initialization, the additional steps of:
   (1) reserving exclusive control of said access port to one of said host computers;
   (2) unlocking a said access port for loading said media cartridge thereinto; and
   (3) releasing, said access port from said exclusive control by said controlling host computer.

6. The method of claim 3, wherein said media cartridge contains magnetic tape.

7. The method of claim 3, wherein said media cartridge library includes a plurality of data read/write devices connected to said host computers and the step of moving includes:
   mounting said media cartridge onto one of said data read/write devices for transferring data therebetween.

8. A method for controlling the loading of at least one computer-readable media cartridge into an access port of an automated media cartridge library having a plurality of host computers connected thereto; said method comprising the steps of:
   (a) unlocking a said access port for loading said media cartridge thereinto;
   (b) releasing any of said host computers in control of said access port from control thereof;

(c) locking said access port after said media cartridge has been loaded into said access port and said access port has thereafter been closed;

(d) broadcasting, to each of said host computers connected to said media cartridge library, a message indicating that said access port is available for reserving;

(e) selecting a controlling one of said host computers to acquire said exclusive control of said access port;

(f) reserving exclusive control of said access port to said controlling one of said host computers;

(g) cataloging each said media cartridge loaded into said access port between step (b) and step (c); and (h) moving each said media cartridge from said access port to a storage location in said media cartridge library;

wherein said steps (a) through (h) are performed by said media cartridge library.

9. The method of claim 8, wherein the step of cataloging includes transmitting, to said controlling one of said host computers, indicia of all said media cartridges loaded into said access port between step (b) and step (c).

10. The method of claim 8, including the additional step of:

reserving, prior to step (a), control of said access port to an initializing one of said host computers.

11. The method of claim 8, wherein said media cartridge contains magnetic tape.

12. The method of claim 8, wherein said media cartridge library includes a plurality of data read/write devices connected to said host computers and the step of moving includes:

mounting said media cartridge onto one of said data read/write devices for transferring data therebetween.

* * * * *